(12) United States Patent
Phillips

(10) Patent No.: US 8,534,630 B2
(45) Date of Patent: Sep. 17, 2013

(54) VEHICLE HOOD OPENING AND CLOSING DEVICES AND METHODS FOR OPENING VEHICLE HOODS

(75) Inventor: Herbert E. Phillips, Waddy, KY (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 131 days.

(21) Appl. No.: 13/313,581

(22) Filed: Dec. 7, 2011

(65) Prior Publication Data

US 2013/0146732 A1 Jun. 13, 2013

(51) Int. Cl.
*A47H 1/10* (2006.01)

(52) U.S. Cl.
USPC ............. 248/327; 248/332; 212/76; 414/737; 414/752.1

(58) Field of Classification Search
USPC ..................... 212/287, 71, 76, 119; 248/317, 248/320, 327, 328, 332; 414/737, 749.1, 414/752.1; 254/385
See application file for complete search history.

(56) References Cited

U.S. PATENT DOCUMENTS

| | | | |
|---|---|---|---|
| 2,176,979 A * | 10/1939 | Platz ............................ | 248/328 |
| 4,552,506 A | 11/1985 | Cummins et al. | |
| 4,589,184 A | 5/1986 | Asano et al. | |
| 4,743,159 A | 5/1988 | Inamori | |
| 4,804,173 A * | 2/1989 | Pol et al. .......................... | 271/11 |
| 4,852,237 A * | 8/1989 | Tradt et al. ................. | 29/407.05 |
| 5,263,687 A * | 11/1993 | Garbiso ......................... | 254/334 |
| 5,326,218 A * | 7/1994 | Fallas ............................ | 414/733 |
| 5,409,347 A | 4/1995 | Suzuki | |
| 5,627,767 A | 5/1997 | Gabiniewicz et al. | |
| 5,733,097 A * | 3/1998 | Herbermann et al. ..... | 414/752.1 |
| 6,163,946 A | 12/2000 | Pryor | |
| 6,237,216 B1 * | 5/2001 | Jin .................................. | 29/800 |
| 6,301,763 B1 | 10/2001 | Pryor | |
| 6,314,631 B1 | 11/2001 | Pryor | |
| 6,865,795 B2 | 3/2005 | Hernandez et al. | |
| 7,044,706 B2 * | 5/2006 | Jung ............................ | 414/737 |
| 7,587,802 B2 | 9/2009 | Tsuchiya et al. | |
| 2006/0015211 A1 | 1/2006 | Kolb et al. | |

* cited by examiner

*Primary Examiner* — Bradley Duckworth
(74) *Attorney, Agent, or Firm* — Dinsmore & Shohl LLP

(57) ABSTRACT

A vehicle hood opening and closing device including a slideable assembly with a linear separator bar that has a first end affixed to a first end support and a second end affixed to a second end support, a first intermediate carriage between the end supports, a second intermediate carriage between the second end support and first intermediate carriage, a first pneumatic cylinder with piston affixed to the first end support and cylinder affixed to the first intermediate carriage, a second pneumatic cylinder with cylinder affixed to the first and second intermediate carriages and piston affixed to a flexible element, wherein the flexible element slideably passes through a pulley assembly affixed to the second end support and attaches to a lift assembly that has a lift plate and at least two vacuum cups, and pneumatic control system pneumatically connected to the two pneumatic cylinders.

20 Claims, 7 Drawing Sheets

VEHICLE HOOD OPENING AND CLOSING DEVICES AND METHODS FOR OPENING VEHICLE HOODS

TECHNICAL FIELD

The present specification generally relates to devices for opening and closing vehicle hoods and, more specifically, to devices for opening and closing vehicle hoods rapidly and reliably without causing damage to vehicle hoods and preventing unintended releases of open vehicle hoods.

BACKGROUND

Production lines for vehicle manufacture require devices to open and close vehicle hoods rapidly and reliably without causing damage to vehicle hoods. While open, vehicle hoods also need to be secure to prevent falls or unintended releases. Vehicle hood opening and closing devices also need to move with vehicles down production lines while maintaining the vehicle hoods in an open position.

Accordingly, a need exists for devices and methods for rapidly and reliably opening and closing vehicle hoods without causing damage to vehicle hoods and preventing unintended releases of open vehicle hoods.

SUMMARY

In one embodiment, a vehicle hood opening and closing device may include a slideable assembly for linear movement in a rail and a pneumatic control system. The slideable assembly may include a linear separator bar with a first end and a second end, wherein the first end may be affixed to a first end support and the second end may be affixed to a second end support. The slideable assembly may include a first intermediate carriage positioned between the first end support and second end support, and a second intermediate carriage positioned between the second end support and the first intermediate carriage. The slideable assembly may include a first pneumatic cylinder with a first piston affixed to the first end support and a first cylinder affixed to the first intermediate carriage. The slideable assembly may include a second pneumatic cylinder with a second piston and a second cylinder, wherein the second cylinder may have a first end and a second end with the first end affixed to the first intermediate carriage opposite the first cylinder and the second end affixed to the second intermediate carriage. The slideable assembly may include a lift assembly for coupling to a vehicle hood, a pulley assembly, and a flexible element. The flexible element may connect the second piston to the lift plate, and the flexible element may slideably pass through the pulley assembly such that the pulley assembly redirects the flexible element from a first direction to a second direction. The pneumatic control system may be pneumatically connected to the first pneumatic cylinder and the second pneumatic cylinder, wherein the pneumatic control system may supply air from an external air source to extend or retract the first pneumatic cylinder and the second pneumatic cylinder, thereby raising and lowering the lift assembly.

In one embodiment, a vehicle hood opening and closing device may include a slideable assembly for linear movement in a rail, a pneumatic control system, a first vacuum generator, and a second vacuum generator. The slideable assembly may include a linear separator bar with a first end and a second end, wherein the first end may be affixed to a first end support and the second end may be affixed to a second end support. The slideable assembly may include a first intermediate carriage positioned between the first end support and the second end support, and a second intermediate carriage positioned between the second end support and the first intermediate carriage. The slideable assembly may include a first pneumatic cylinder with a first piston affixed to the first end support and a first cylinder affixed to the first intermediate carriage. The slideable assembly may include a second pneumatic cylinder with a second piston and a second cylinder, wherein the second cylinder may have a first end and a second end with the first end affixed to the first intermediate carriage opposite the first cylinder and the second end affixed to the second intermediate carriage. The slideable assembly may include a lift assembly, a pulley assembly, and a flexible element. The lift assembly may include a lift plate and at least two vacuum cups connected to the lift plate, wherein the at least two vacuum cups facilitate attachment of the lift assembly to a vehicle hood. The flexible element may connect the second piston to the lift plate, and the flexible element may slideably pass through the pulley assembly such that the pulley assembly redirects the flexible element from a first direction to a second direction. The pneumatic control system may be pneumatically connected to the first pneumatic cylinder and the second pneumatic cylinder, wherein the pneumatic control system may supply air from an external air source to extend or retract the first pneumatic cylinder and the second pneumatic cylinder, thereby raising and lowering the lift assembly. The first vacuum generator may be pneumatically coupled to one of the at least two vacuum cups. The second vacuum generator may be pneumatically coupled to another of the at least two vacuum cups, wherein the second vacuum generator is independent and redundant of the first vacuum generator such that both vacuum generators independently provide sufficient vacuum to maintain the lift assembly in the open position when attached to a vehicle hood.

A method for opening and closing a vehicle hood may include conveying a vehicle on a production line, providing a rail suspended over the vehicle production line, and providing a vehicle hood opening and closing device slideably coupled to the rail. The vehicle hood opening and closing device may include a slideable assembly for linear movement with respect to the rail and a pneumatic control system. The slideable assembly may include a linear separator bar with a first end and a second end, the first end affixed to a first end support and the second end affixed to a second end support. The slideable assembly may include a first intermediate carriage positioned between the first end support and the second end support, and a second intermediate carriage positioned between the second end support and the first intermediate carriage. The slideable assembly may further include a first pneumatic cylinder with a first piston affixed to the first end support and a first cylinder affixed to the first intermediate carriage. The slideable assembly may further include a second pneumatic cylinder with a second piston and a second cylinder, wherein the second cylinder has first and second ends with the first end affixed to the first intermediate carriage opposite the first cylinder and the second end affixed to the second intermediate carriage. The slideable assembly may further include a lift assembly, a pulley assembly, and a flexible element. The lift assembly may include a lift plate and at least two vacuum cups affixed to the lift plate, wherein the at least two vacuum cups facilitate attachment of the lift assembly to a vehicle hood. The flexible element may connect the second piston to the lift plate and pass through the pulley assembly such that the pulley assembly redirects the flexible element from a first direction to a second direction. The pneumatic control system may be pneumatically coupled to the first pneumatic cylinder and the second pneumatic cylinder, wherein the pneumatic control system supplies air from an external air source to extend or retract the first pneumatic cylinder and the second pneumatic cylinder. The method may further include supplying vacuum to the at least two vacuum cups, attaching the at least two vacuum cups to a vehicle hood, and supplying air pressure to the first and second pneumatic cylinders, wherein the first and second pistons fully retract into the housings of the first and second cylinders such that the first cylinder and attached first intermediate carriage are pulled laterally toward the first end support, the second cylinder, which is affixed to the first intermediate carriage, and attached second intermediate carriage are pulled laterally toward the first end support, the flexible member affixed to the second piston is pulled vertically upward toward the pulley assembly and is redirected through the pulley assembly laterally toward the first end support, and the lift assembly with an attached vehicle hood is pulled by the affixed flexible member vertically upward, thereby opening the vehicle hood. The method may further include terminating air pressure to the first and second pneumatic cylinders, wherein the first and second pistons fully extend from the housings of the first and second cylinders such that the first cylinder and attached first intermediate carriage are pushed laterally toward the second end support, the second cylinder, which is affixed to the first intermediate carriage, and attached second intermediate carriage are pushed laterally toward the second end support, the flexible member affixed to the second piston is released laterally toward the pulley assembly and is redirected through the pulley assembly vertically downward toward the vehicle, and the lift assembly with an attached vehicle hood is released vertically downward toward the vehicle, thereby closing the vehicle hood.

These and additional features provided by the embodiments of the present invention will be more fully understood in view of the following detailed description, in conjunction with the drawings.

BRIEF DESCRIPTION OF THE DRAWINGS

The embodiments set forth in the drawings are illustrative and exemplary in nature and not intended to limit the inventions defined by the claims. The following detailed description of the illustrative embodiments can be understood when read in conjunction with the following drawings, where like structure is indicated with like reference numerals and in which:

DETAILED DESCRIPTION

Figure 1:
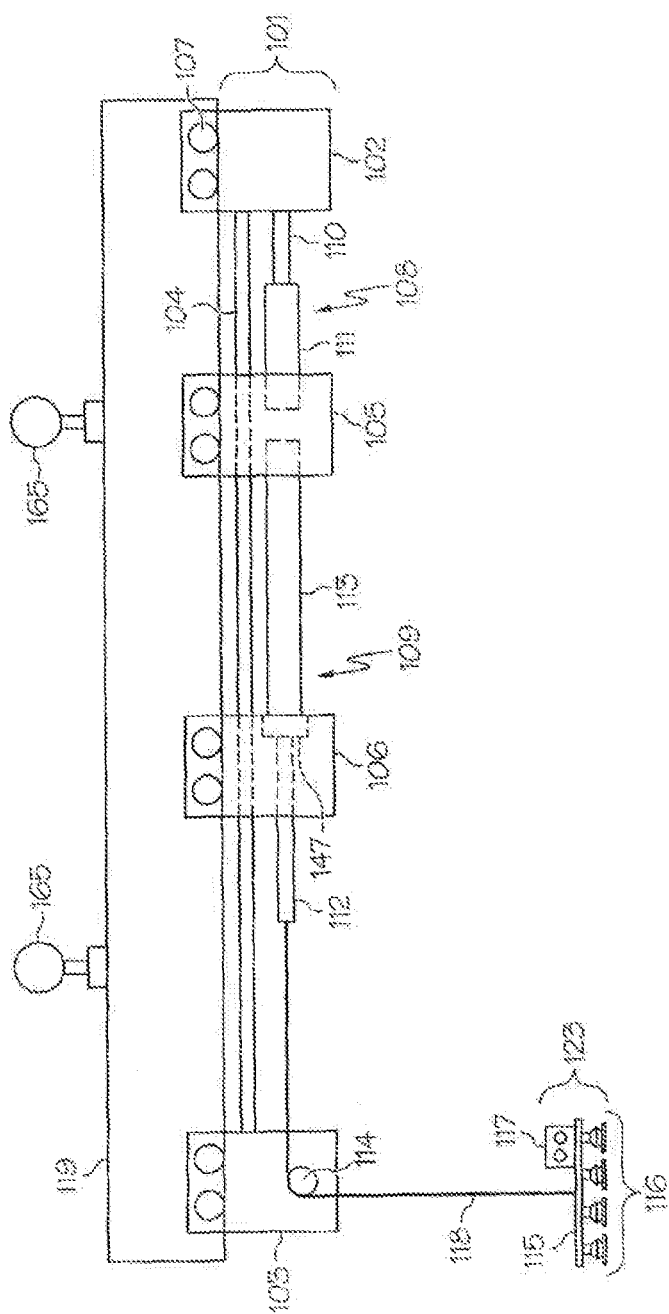
FIG. 1 schematically depicts a slideable assembly of a vehicle hood opening and closing device according to at least one embodiment shown and described herein.

FIG. 1 depicts one embodiment of a device for opening and closing vehicle hoods. The device generally includes carriages for linear movement in a rail, pneumatic cylinders, and a lift assembly with at least two vacuum cups for attachment to vehicle hoods. Some embodiments are designed for use in an external rail and other embodiments include a rail. The vehicle hood opening and closing devices will generally be described in the context of vehicle production lines, but may also be used in other systems for opening and closing containers or other objects with lids, or for attachment to various objects to be moved from one location to another. Additional details of the vehicle hood opening and closing devices will be described further herein with specific reference to the appended drawings.

Referring now to FIG. 1, a slideable assembly 101 of a vehicle hood opening and closing device is depicted. The slideable assembly 101 includes a linear separator bar 104 with a first end and a second end. The first end of the linear separator bar is affixed to a first end support 102 and the second end is affixed to a second end support 103. The linear separator bar 104 may comprise any metallic, composite, or other sufficiently rigid material. The linear separator bar 104 maintains a pre-defined distance between the first end support 102 and the second end support 103. The first and second end supports 102, 103 are assemblies for affixing the slideable assembly 101 to an external rail 119 and may comprise any metallic, composite, or other sufficiently rigid material. In one embodiment (as shown in FIG. 1), the first and second end supports 102, 103 may be carriages or other suitable assemblies for affixing the slideable assembly 101 to an external rail 119.

As shown in FIG. 1, the slideable assembly 101 also includes a first intermediate carriage 105 positioned between the first end support 102 and the second end support 103, and a second intermediate carriage 106 positioned between the second end support 103 and the first intermediate carriage 105. The first intermediate carriage 105 and second intermediate carriage 106 include wheels, rails, bearings, or other components for low friction, slideable movement with respect to a rail 119.

The slideable assembly 101 also includes a first pneumatic cylinder 108 and a second pneumatic cylinder 109. The pneumatic cylinders 108 and 109 include piston and cylinder components and may be spring-loaded single acting pneumatic cylinders or double acting pneumatic cylinders. The first pneumatic cylinder 108 includes a first piston 110 affixed to the first end support 102 and a first cylinder 111 affixed to the first intermediate carriage 105. The second pneumatic cylinder 109 includes a second piston 112 and a second cylinder 113. The second cylinder 113 has a first end and a second end with the first end affixed to the first intermediate carriage 105 opposite the first cylinder 111 and the second end affixed to the second intermediate carriage 106.

The first piston 110 and second piston 112 are depicted in "fully extended" positions, meaning the pistons 110 and 112 are fully extended out of the housings of the cylinders 111 and 113. Alternatively, the pistons 110 and 112 are in "fully retracted" positions when the pistons fully retract into the housings of the cylinders 111 and 113. When the first piston 110, which is affixed to the stationary first end support 102, fully retracts, the housing of the first cylinder 111 moves laterally toward the first end support 102 over the first piston 110, the first intermediate carriage 105 affixed to the first cylinder 111 is pulled with the first cylinder 111 laterally toward the first end support 102, and the second cylinder 113, which is affixed to the first intermediate carriage 105 and the second intermediate carriage 106, is pulled with the affixed second intermediate carriage 106 laterally toward the first end support 102.

In some embodiments, the pneumatic cylinders 108 and 109 optionally include braking components. In the embodiment depicted in FIG. 1, the second pneumatic cylinder 109 contains a brake component 147 to prevent the second piston 112, when in the fully retracted position, from extending out of the housing of the second cylinder 113 if air pressure to the second pneumatic cylinder 109 is lost, thereby preventing a vehicle hood 120 that is in an open position when air pressure is lost from unintentionally closing. The pneumatic cylinders 108 and 109 may also optionally include speed control valves to regulate the extension speeds of the pistons 110 and 112, when fully retracted, out of the respective housings of the cylinders 111 and 113.

In an embodiment, the slideable assembly 101 includes a pulley assembly 114. The pulley assembly 114 includes an axle affixed to the second end support 103 and a wheel for rotational movement with respect to the second end support 103. Alternatively, the pulley assembly 114 may be a sprocket assembly with an axle affixed to the second end support 103 and a cogged wheel for rotational movement with respect to the second end support 103.

Figure 7:
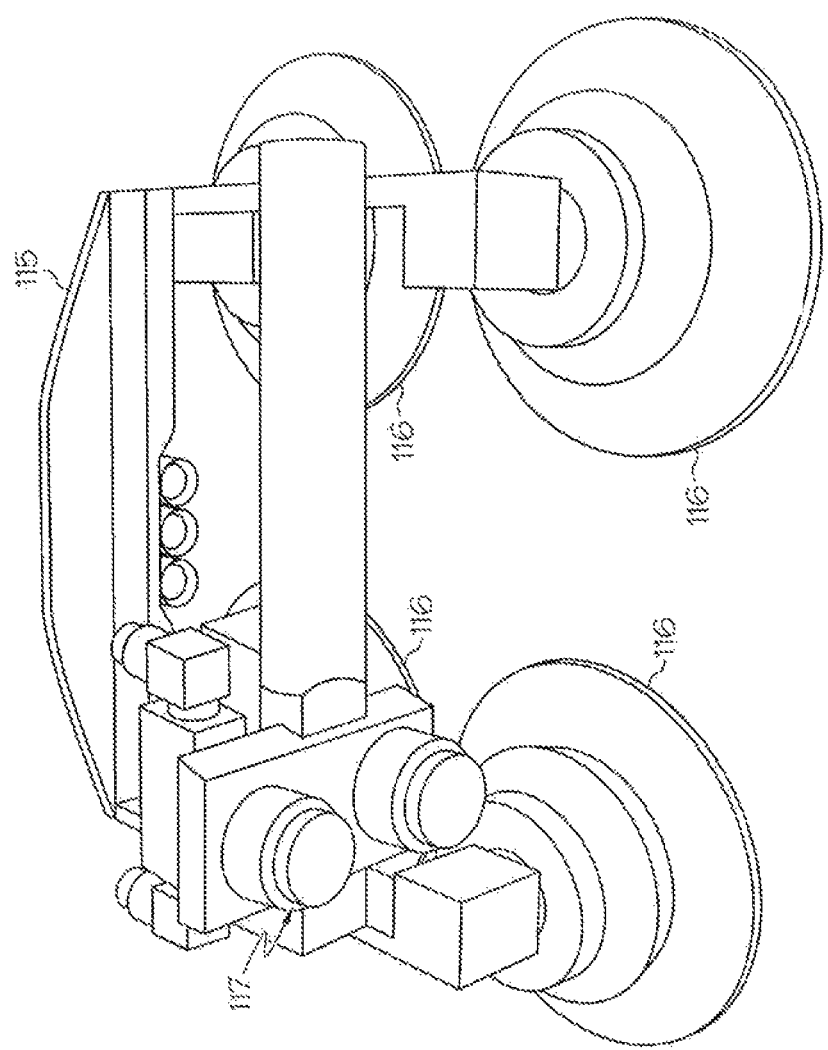
FIG. 7 schematically depicts a lift assembly of a vehicle hood opening and closing device according to at least one embodiment shown and described herein.

Still referring to FIG. 1, the slideable assembly 101 also includes a lift assembly 123. The lift assembly 123 may include a lift plate 115 and at least two vacuum cups 116 affixed to the lift plate 115. The at least two vacuum cups 116 facilitate attachment of the lift assembly 123 to an article to be lifted, such as, for example, a vehicle hood 120. The lift plate 115 may be formed from any metallic, composite, or other sufficiently rigid material. The at least two vacuum cups 116 may comprise rubber, nylon, or other flexible material. The lift assembly 123 may also optionally include operator controls 117 with "up," "down," or other needed functions. One embodiment of the lift assembly 123 is depicted in FIG. 7, showing the lift plate 115, vacuum cups 116, and optional operator controls 117.

The slideable assembly 101 also includes a flexible member 118 that connects the second piston 112 to the lift assembly 123. The flexible member 118 slideably passes through the pulley assembly 114. The pulley assembly 114 redirects the flexible member 118 from a first direction to a second direction. The flexible member 118 may be a chain, rope, cable, belt, or other flexible component. In one embodiment, the flexible member 118 is a chain for rotational motion over a pulley assembly with a cogged wheel.

Figure 5:
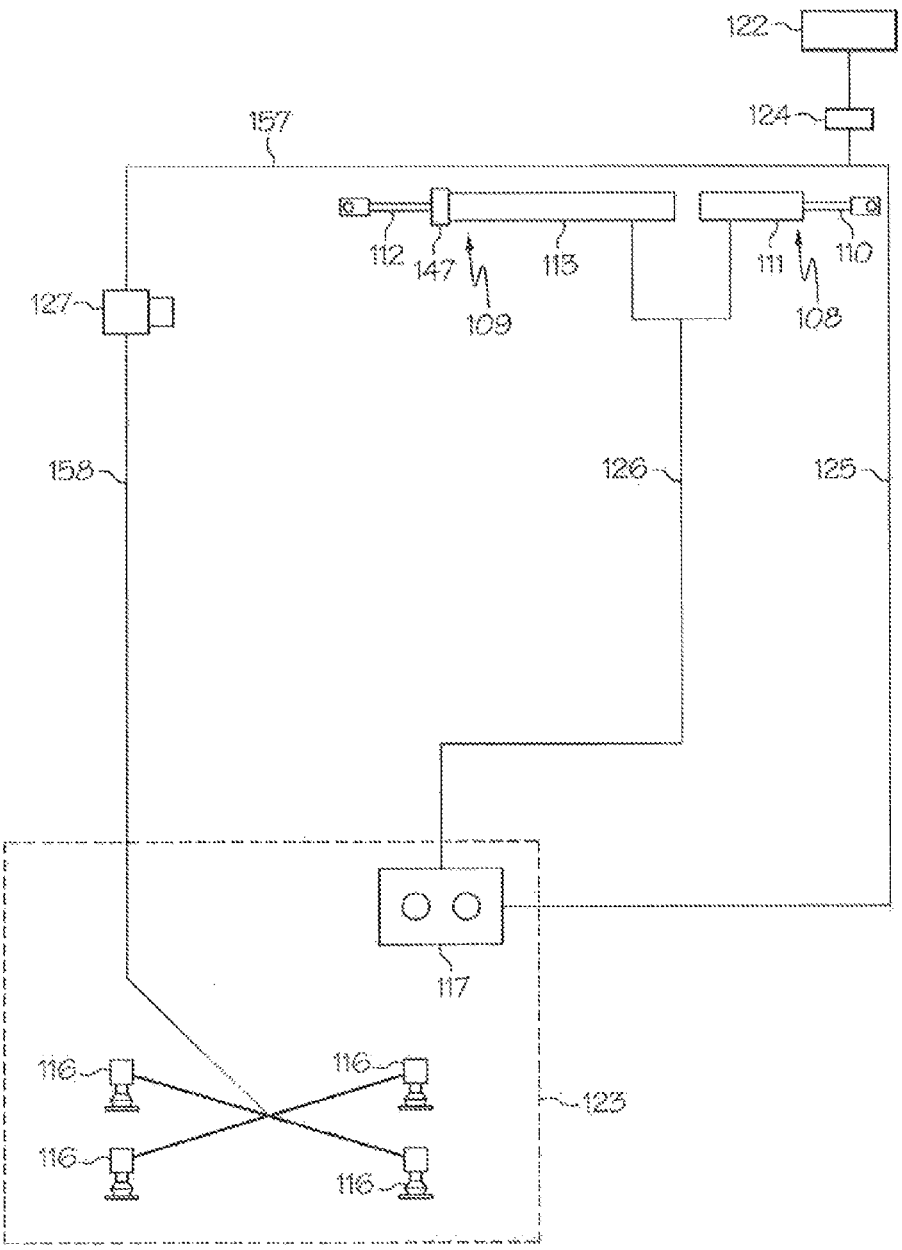
FIG. 5 schematically depicts a pneumatic system of a vehicle hood opening and closing device according to at least one embodiment shown and described herein.

Referring now to FIG. 5, one embodiment of a pneumatic control system for use with the slideable assembly 101 is schematically depicted. The pneumatic control system includes pneumatic couplings, such as, hoses, tubes, or conduit for directing vacuum and air flow. The pneumatic couplings may be formed from metallic, rubber, plastic, or other suitable material. The pneumatic control system includes a valve 124 for connection to an external air supply source 122 that provides positive air pressure to the pneumatic control system. The pneumatic control system of this embodiment includes pneumatic conduit 125 pneumatically coupling the external air supply source 122 to external or optionally included operator controls 117, which are shown in FIG. 5 as affixed to the lift assembly 123. The operator controls 117 are pneumatically coupled with conduit 126 to the first pneumatic cylinder 108 and the second pneumatic cylinder 109, and may include an "up" function that allows positive air pressure from the external air supply source 122 to pass to the first pneumatic cylinder 108 and the second pneumatic cylinder 109 through pneumatic conduit 126. The embodiment shown in FIG. 5 depicts spring-loaded, single acting pneumatic cylinders. The positive air pressure to the pneumatic cylinders 108 and 109 causes the first and second pistons 110 and 112 to fully retract into the respective housings of the first and second cylinders 111 and 113.

Figure 3:
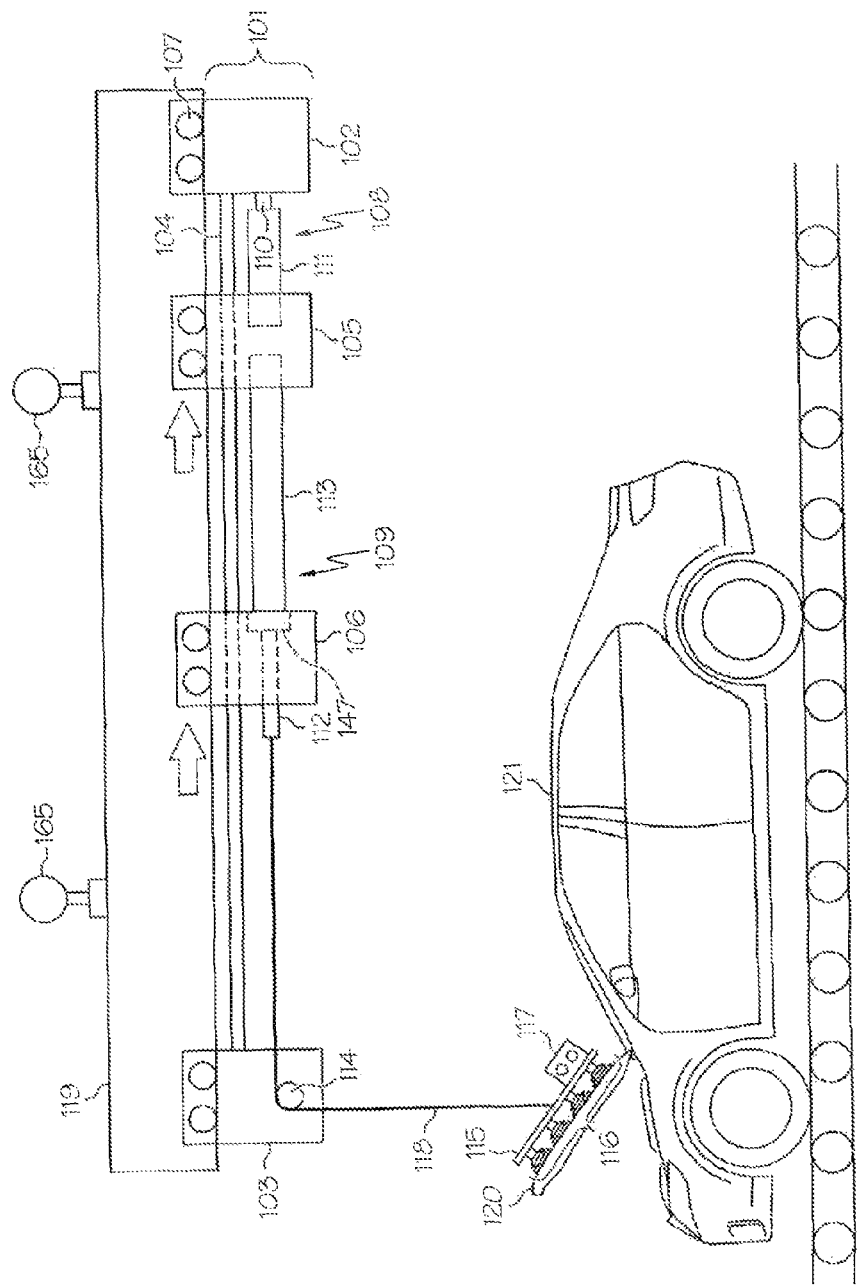
FIG. 3 schematically depicts a slideable assembly of a vehicle hood opening and closing device according to at least one embodiment shown and described herein attached to a vehicle hood in a first open position.
Figure 4:
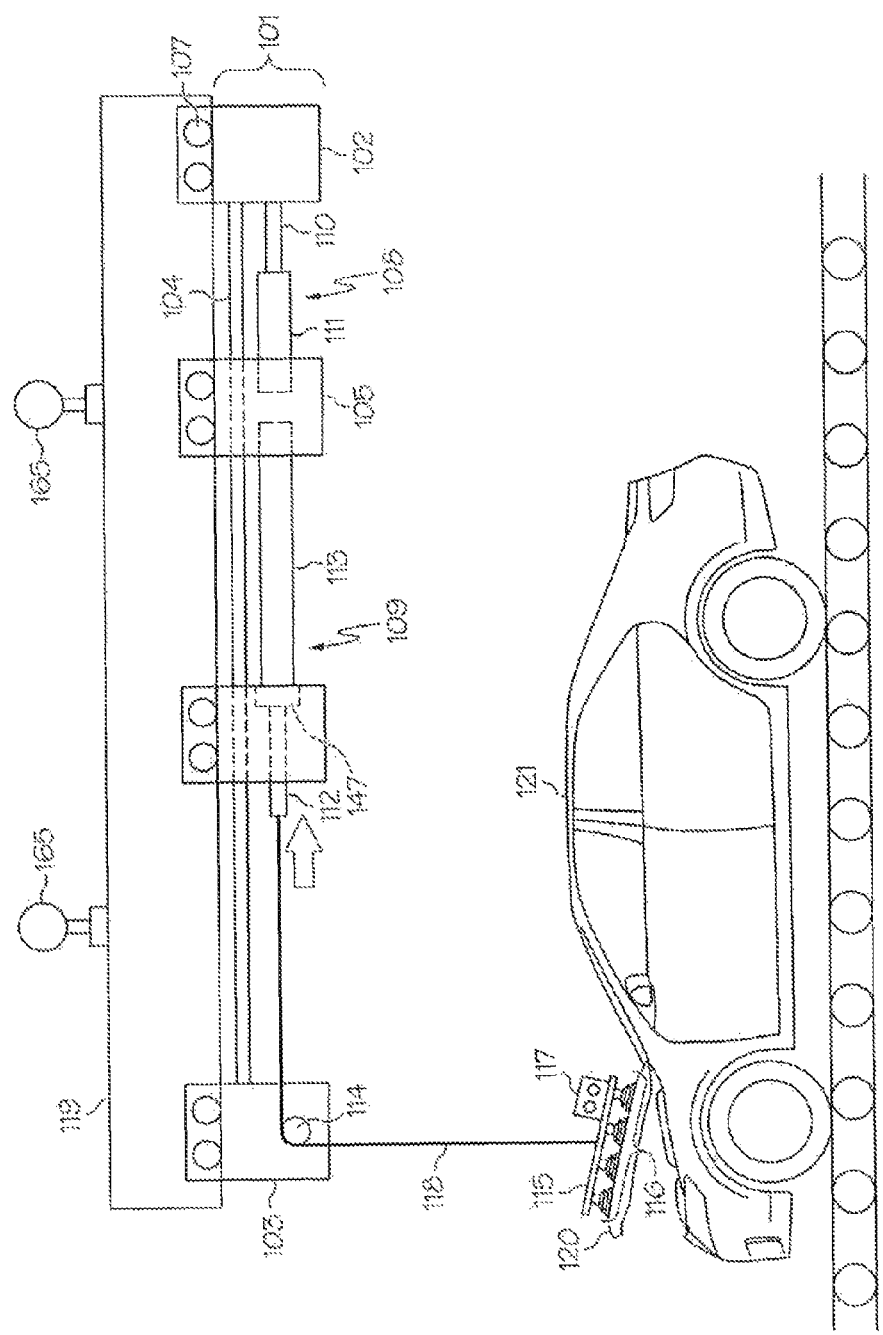
FIG. 4 schematically depicts a slideable assembly of a vehicle hood opening and closing device according to at least one embodiment shown and described herein attached to a vehicle hood in a second open position.

Referring now to FIG. 3, retraction of the first piston 110, which is affixed to the first end support 102, pulls the first cylinder 111 and affixed first intermediate carriage 105 laterally toward the first end support 102. This causes the second cylinder 113, which is affixed to the first intermediate carriage 105, and affixed second intermediate carriage 106 to be pulled laterally toward the first end support 102. The retraction of the second piston 112 pulls the affixed flexible member 118 and lift assembly 123 vertically upward toward the pulley assembly 114, wherein the pulley assembly 114 redirects the flexible member laterally toward the first end support 102. When the lift assembly 123 is attached to vehicle hood 120, the vehicle hood 120 is also raised along with the lift assembly 123.

Figure 2:
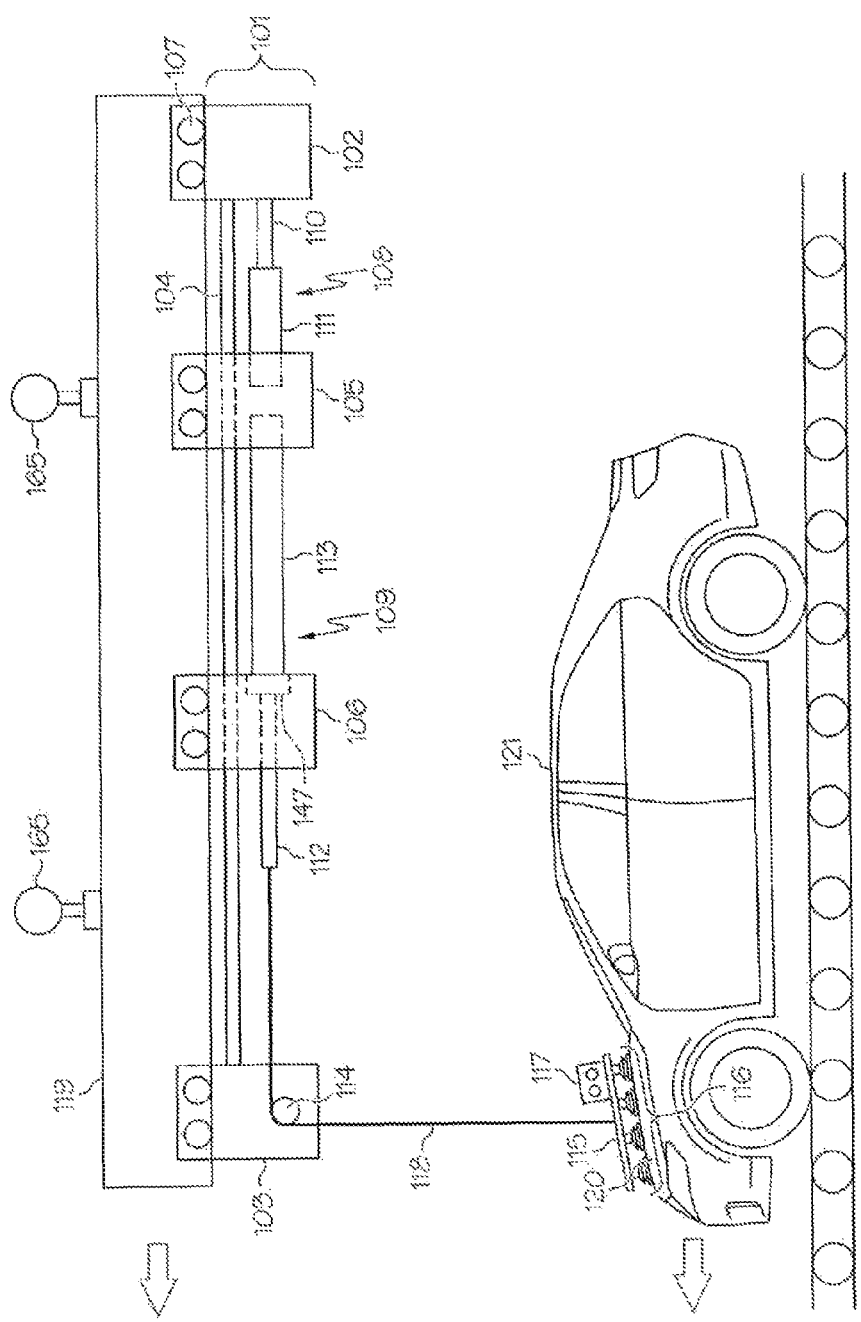
FIG. 2 schematically depicts a slideable assembly of a vehicle hood opening and closing device according to at least one embodiment shown and described herein attached to a vehicle hood in the closed position.

The operator controls 117 may also include a "down" function that terminates positive air pressure to the first pneumatic cylinder 108 and the second pneumatic cylinder 109. This causes the fully retracted first and second pistons 110 and 112 to fully extend out of the housings of the respective first and second cylinders 111 and 113. Referring now to FIG. 2, the extension of the first piston 110, which is affixed to the first end support 102, pushes the first cylinder 111 and affixed first intermediate carriage 105 laterally toward the second end support 103. This causes the second cylinder 113, which is affixed to the first intermediate carriage 105, and the second intermediate carriage 106 to be pushed laterally in the direction of the second end support 103. The second piston 112 also extends, releasing the attached flexible member 118 laterally toward the pulley assembly 114, wherein the pulley assembly 114 redirects the flexible member 118 vertically downward toward the vehicle 121.

The pneumatic control system schematically depicted in FIG. 5 also includes an external vacuum generator 127. The external vacuum generator is pneumatically coupled with conduit 158 to the at least two vacuum cups 116 of the lift assembly 123.

Figure 6:
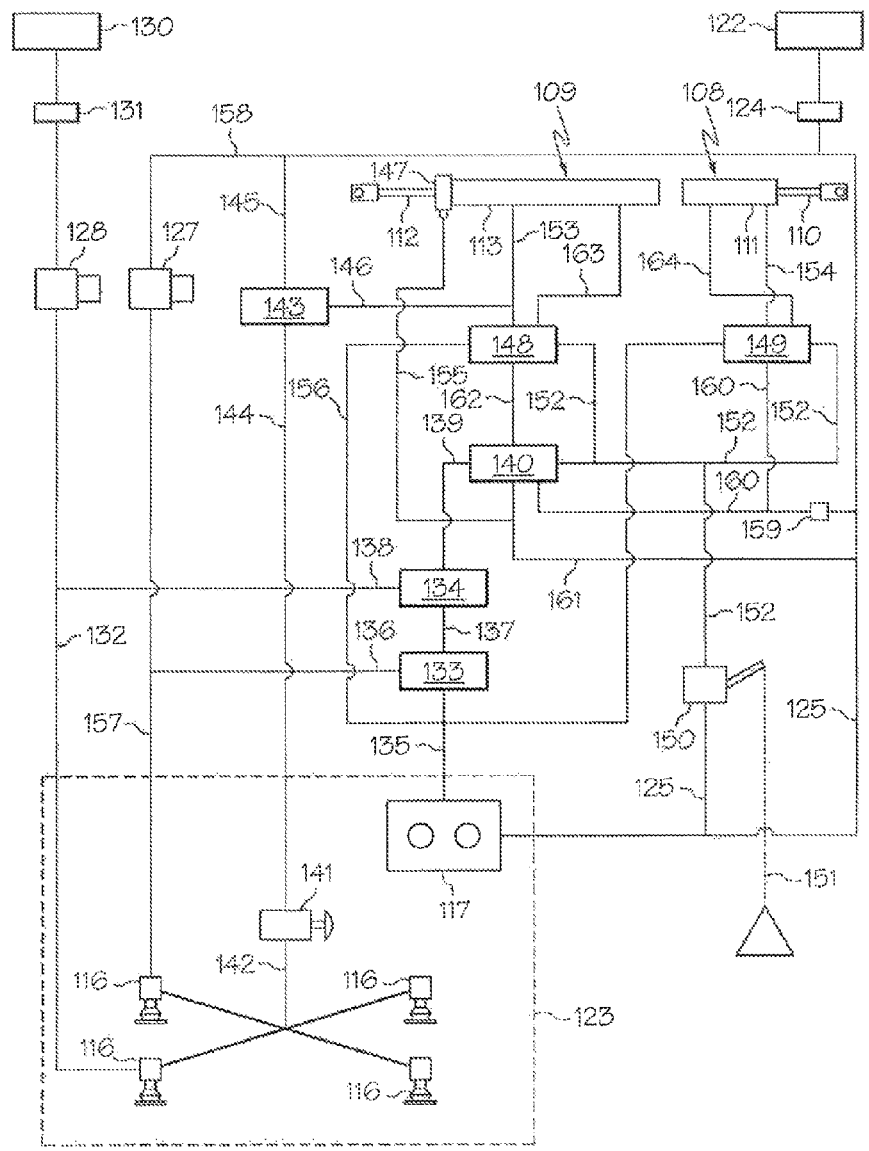
FIG. 6 schematically depicts a pneumatic system of a vehicle hood opening and closing device with two independent vacuum generators and optional pneumatic valves according to at least one embodiment shown and described herein.

In another embodiment, a pneumatic control system includes a first vacuum generator 127 and a second vacuum generator 128 as shown in FIG. 6. The first vacuum generator 127 is pneumatically coupled with conduit 158 to a first external air supply source 122 with a connection valve 124, and pneumatically coupled with conduit 157 to one of the at least two vacuum cups 116 affixed to the lift assembly 123. The second vacuum generator 128 contains a valve 131 for connection to a second external air supply source 130, with the second external air supply source 130 being independent of the first external air supply source 122. The second vacuum generator 128 is pneumatically coupled with conduit 132 to another of the at least two vacuum cups 116 affixed to the lift assembly 123. The first vacuum generator 127 and the second vacuum generator 128 are independent and redundant such that both independently provide sufficient vacuum to maintain attachment to a vehicle hood 120. The vacuum generators 127 and 128 may optionally include internal non-return valves that maintain vacuum if air pressure is lost to the vacuum generators 127 and 128, thereby maintaining attachment to a vehicle hood 120 following loss of air pressure to the vacuum generators.

In some embodiments, the pneumatic control system depicted in FIG. 6 optionally includes a first vacuum confirm valve 133 and a second vacuum confirm valve 134. The first vacuum confirm valve 133 is pneumatically coupled with conduit 135 to the operator controls 117, pneumatically coupled with conduit 136 to the pneumatic conduit 157 connecting the first vacuum generator 127 to one of the at least two vacuum cups 116, and pneumatically coupled with conduit 137 to the second vacuum confirm valve 134. The second vacuum confirm valve 134 is pneumatically coupled with conduit 138 to the pneumatic conduit 132 pneumatically coupling the second vacuum generator 128 to another of the at least two vacuum cups 116, and pneumatically coupled with conduit 139 to a high pressure enable valve 140. Alternatively, the second vacuum confirm valve 134 could be pneumatically coupled directly to the first pneumatic cylinder 108 and the second pneumatic cylinder 109.

When the first vacuum confirm valve 133 receives positive air pressure, the first vacuum confirm valve 133 checks for vacuum in the pneumatic conduit 157. If vacuum is confirmed in the pneumatic conduit 157, the first vacuum confirm valve 133 directs positive air pressure to the second vacuum confirm valve 134. If vacuum is not confirmed in the pneumatic conduit 157, the first vacuum confirm valve 133 will not direct positive air pressure to the second vacuum confirm valve 134. The second vacuum confirm valve 134 checks for vacuum in the pneumatic conduit 132. If vacuum is confirmed in the pneumatic conduit 132, the second vacuum confirm valve 134 directs positive air pressure to the high pressure enable valve 140 or, in an alternative embodiment, directly to the first pneumatic cylinder 108 and the second pneumatic cylinder 109. If vacuum is not confirmed in the pneumatic conduit 132, the second vacuum confirm valve 134 will not direct positive air pressure to the high pressure enable valve 140 or, in an alternative embodiment, directly to the first pneumatic cylinder 108 and the second pneumatic cylinder 109. The first vacuum confirm valve 133 and second vacuum confirm valve 134 terminate positive air pressure before it reaches the pneumatic cylinders 108 and 109, preventing the pistons 110 and 112 from retracting and opening a vehicle hood attached to the lift assembly 123 when there is a failure of vacuum from either vacuum generator 127 or 128.

Referring now to FIG. 6, some embodiments of the pneumatic control system include a high pressure enable valve 140, a first regulator valve 148, a second regulator valve 149, an air pressure regulator 159, and a down valve 150. The air pressure regulator 159 allows the user to deliver air pressure to the pneumatic cylinders 108 and 109 different from the air pressure from the external air supply source 122.

The high pressure enable valve 140 is pneumatically coupled with conduit 139 to the second vacuum confirm valve 134, pneumatically coupled with conduit 162 to the first regulator valve 148, pneumatically coupled with conduit 152 to the down valve 150, pneumatically coupled with conduit 160 to the air pressure regulator 159, and pneumatically coupled with conduit 161 to the first external air supply source 122. When vacuum is confirmed in the first vacuum confirm valve 133 and the second vacuum confirm valve 134, the second vacuum confirm valve 134 allows positive air pressure to the high pressure enable valve 140 through the pneumatic conduit 139. When positive air pressure is received at the high pressure enable valve 140, the high pressure enable valve 140 directs the positive air pressure from pneumatic conduit 161 to the first regulator valve 148 through pneumatic conduit 162.

The first regulator valve 148 is pneumatically coupled with conduit 153 and 163 to the second pneumatic cylinder 109, pneumatically coupled with conduit 156 to the second regulator valve 149, pneumatically coupled with conduit 152 to the down valve 150, and pneumatically coupled with conduit 160 to the air pressure regulator 159. When the first regulator valve 148 receives positive air pressure from the high pressure enable valve 140 through pneumatic conduit 162, it directs the positive air pressure to the second pneumatic cylinder 109 through pneumatic conduit 153, causing the second piston 112 to fully retract into the housing of the second cylinder 113. The first regulator valve 148 further directs the positive air pressure to the second regulator valve 149 through the pneumatic conduit 156.

The second regulator valve 149 is pneumatically coupled with conduit 154 and 164 to the first pneumatic cylinder 108, pneumatically coupled with conduit 152 to the down valve 150, and pneumatically coupled with conduit 160 to the air pressure regulator 159. When positive air pressure is received from the first regulator valve 148 at the second regulator valve 149, the second regulator valve 149 directs positive air pressure from the air pressure regulator 159 through the pneumatic conduit 160 to the first pneumatic cylinder 108 through the pneumatic conduit 154, causing the first piston 110 to fully retract into the housing of the first cylinder 111.

In this embodiment, the pneumatic cylinders 108 and 109 are double acting pneumatic cylinders requiring dual pneumatic conduit lines, wherein conduit lines 153 and 154 to pneumatic cylinders 108 and 109 deliver positive air pressure to fully retract the pistons 110 and 112, and pneumatic conduit lines 163 and 164 to pneumatic cylinders 108 and 109 deliver positive air pressure to fully extend the pistons 110 and 112.

The down valve 150 is pneumatically coupled with conduit 125 to the first external air supply source 122, pneumatically coupled with conduit 152 to the high pressure enable valve 140, pneumatically coupled with conduit 152 to the first regulator valve 148, and pneumatically coupled with conduit 152 to the second regulator valve 149. The down valve 150 also optionally includes a down cord 151. When a user pulls the down cord 151, the down valve 150 directs positive air pressure from the first external air supply source 122 to the high pressure enable valve 140, the first regulator valve 148, and the second regulator valve 149 all through the pneumatic conduit 152. When positive air pressure from the down valve 150 is directed to the high pressure enable valve 140 through the pneumatic conduit 152, the high pressure enable valve 140 terminates positive air pressure to the first regulator valve 148, thereby terminating the source of positive air pressure the first regulator valve 148 directs to the second pneumatic cylinder 109 through the pneumatic conduit 153 and to the second regulator valve 149 through the pneumatic conduit 156. When positive air pressure from the down valve 150 is directed to the high pressure enable valve 140, the high pressure enable valve 140 further directs the positive air pressure from the air pressure regulator 159 through the pneumatic conduit 160 to the first regulator valve 148 through the pneumatic conduit 162.

When positive air pressure from the down valve 150 is directed to the first regulator valve 148, the first regulator valve 148 directs the positive air pressure from the high pressure enable valve 140 through the air pressure regulator 159 to the second pneumatic cylinder 109 through the pneumatic conduit 163, causing the second piston 112 to fully extend out of the housing of the second cylinder 113.

When positive air pressure from the down valve 150 is directed to the second regulator valve 149, the second regulator valve 149 redirects the positive air pressure from the air pressure regulator 159 to the first pneumatic cylinder 108 through the pneumatic conduit 164, causing the first piston 110 to fully extend out of the housing of the first cylinder 111.

In an embodiment shown in FIG. 6, the positive air pressure from the air pressure regulator 159 is sufficient to raise the lift assembly 123 when the lift assembly 123 is not attached to a vehicle hood 120. The air pressure regulator 159 directs positive air pressure through pneumatic coupling 160 to the second regulator valve 149 and the high pressure enable valve 140. The second regulator valve 149 directs the positive air pressure to the first pneumatic cylinder 108 through pneumatic coupling 154 causing the first piston 110 to fully retract into the housing of the first cylinder 111. The high pressure enable valve 140 directs the positive air pressure to the first regulator valve 148 through pneumatic coupling 162. The first regulator valve 148 directs the positive air pressure to the second pneumatic cylinder 109 through pneumatic coupling 153 causing the second piston 112 to fully retract into the housing of the second cylinder 113. The retraction of the first piston 110, which is affixed to the first end support 102, pulls the first cylinder 111 and affixed first intermediate carriage 105 laterally toward the first end support 102. This causes the second cylinder 113, which is affixed to the first intermediate carriage 105, and affixed second intermediate carriage 106 to be pulled laterally toward the first end support 102. The retraction of the second piston 112 pulls the affixed flexible member 118 and lift assembly 123 vertically upward toward the pulley assembly 114.

In an embodiment, the first piston 110 fully extends over a distance of 400 millimeters and the second piston 112 fully extends over a distance of 600 millimeters. In this embodiment, the positive air pressure from the external air supply source 122 is set to 55 psi, which is sufficient pressure to fully retract the second piston 112 when the lift assembly is attached to a vehicle hood 120, thereby opening the vehicle hood 120 to a first position of 600 millimeters vertically upward with respect to the vehicle 121. The positive air pressure from the air pressure regulator 159 is set at 17.4 psi in this embodiment, which is not sufficient to fully retract the first piston 110, but is sufficient to maintain a vehicle hood 120 in a set position. The first piston 110 will only retract with assistance of a user pushing upward on the underside of the vehicle hood 120. When a user pushes the vehicle hood 120 upward from the first position of 600 millimeters, the first piston 110 will retract 400 millimeters, opening the vehicle hood 120 to a second position of 1000 millimeters vertically upward with respect to the vehicle 121. Once a vehicle hood 120 is raised to a second position of 1000 millimeters, the 55 psi positive air pressure to the second pneumatic cylinder 109 and 17.4 psi positive air pressure to the first pneumatic cylinder 108 are sufficient to maintain the vehicle hood 120 at the second position of 1000 millimeters.

Referring now to FIG. 6, the pneumatic control system includes an optional air blow-off valve 141 pneumatically coupled with conduit 144 and 145 to the first external air supply source 122 and pneumatically coupled with conduit 142 to the at least two vacuum cups 116. When a user activates the air blow-off valve 141, the air blow-off valve 141 directs positive air pressure from the first external air supply source 122 into the at least two vacuum cups 116, overriding the vacuum and causing the at least two vacuum cups 116 to release from a vehicle hood 120.

The pneumatic control system may also include an air blow-off disable valve 143 pneumatically coupled with conduit 145 to the first external air supply source 122, pneumatically coupled with conduit 144 to the air blow-off valve 141, and pneumatically coupled with conduit 146 to the pneumatic conduit 153 connecting the first regulator valve 148 to the second pneumatic cylinder 109. The air blow-off disable valve 143 terminates positive air pressure from the first external air supply source 122 to the air blow-off valve 141 when the air blow-off disable valve 143 receives positive air pressure from the pneumatic conduit 153, signaling that the second piston 112 is fully retracted and a vehicle hood 120 attached to the lift assembly 123 is in the open position, thereby preventing the vehicle hood 120 from closing due to unintended user contact with the blow-off valve 141.

In an embodiment shown in FIG. 6, the second pneumatic cylinder 109 has an attached brake 147. The brake 147 is pneumatically coupled with conduit 155 and 161 to the external air supply source 122. The external air supply source 122 provides positive air pressure to the brake 147. If positive air pressure from the external air supply source 122 is lost, the brake 147 contracts and prevents the second piston 112 from extending due to the loss of air power, and thereby preventing an unintended closing of a vehicle hood 120. In other embodiments, each of the pneumatic cylinders 108 and 109 has a brake.

Methods of using the vehicle hood opening and closing device depicted in FIG. 1 will now be described with reference to FIGS. 2 and 3 and with reference to the pneumatic control system in FIG. 5. Referring now to FIG. 2, which depicts a vehicle hood 120 in the closed position, a method for opening the vehicle hood 120 includes conveying a vehicle on a production line. A rail 119 is attached to an overhead conveyor with mounting assemblies 165 such that the rail 119 moves with a vehicle conveyed on the production line. The slideable assembly 101 is affixed to the rail 119. Vacuum is supplied to the at least two vacuum cups 116. A user then attaches the at least two vacuum cups 116 to a vehicle hood 120. Positive air pressure is then supplied to the pneumatic cylinders 108 and 109, which causes the first and second pistons 110 and 112 to fully retract into the respective housings of the first and second cylinders 111 and 113.

Referring now to FIG. 3, the retraction of the first piston 110, which is affixed to the first end support 102, pulls the first cylinder 111 and affixed first intermediate carriage 105 laterally toward the first end support 102. This causes the second cylinder 113, which is affixed to the first intermediate carriage 105, and affixed second intermediate carriage 106 to be pulled laterally toward the first end support 102. The retraction of the second piston 112 pulls the affixed flexible member 118 and lift assembly 123 with attached vehicle hood vertically upward toward the pulley assembly 114, wherein the pulley assembly redirects the flexible member 118 laterally toward the first end support 102, thereby opening the vehicle hood 120. Since the rail 119 is conveyed down the line with the vehicle 121, the hood is maintained in the open position as the vehicle 121 travels down the line.

To close the vehicle hood 120, positive air pressure to the pneumatic cylinders 108 and 109 is terminated. In one embodiment, the pneumatic cylinders 108 and 109 are spring-loaded, single acting pneumatic cylinders and, when positive air pressure is terminated, the springs cause the first and second pistons 110 and 112 to fully extend out of the housings of the respective first and second cylinders 111 and 113. Referring now to FIG. 2, extension of the first piston 110, which is affixed to the first end support 102, pushes the first cylinder 111 and affixed first intermediate carriage 105 laterally toward the second end support 103. This causes the second cylinder 113, which is affixed to the first intermediate carriage 105, and the second intermediate carriage 106, to be pushed laterally in the direction of the second end support 103. The second piston 112 also extends, releasing the attached flexible member 118 laterally toward the pulley assembly 114, wherein the pulley assembly 114 redirects the flexible member 118 vertically downward toward the vehicle 121. This allows the lift assembly 123 and attached vehicle hood 120 to return to the vehicle 121 and the vehicle hood 120 to be closed.

In some methods, a vehicle hood 120 is opened to a first position P1 and optionally may be opened to a second position P2. A method of opening a vehicle hood 120 to a first position P1 includes supplying air pressure to the second pneumatic cylinder 109, causing the second piston 112 to fully retract into the housing of the second cylinder 113, the flexible member 118 affixed to the second piston 112 to be pulled vertically upward toward the pulley assembly 114 and redirected through the pulley assembly 114 laterally toward the first end support 102, and the lift assembly 123 with an attached vehicle hood 120 to be pulled by the affixed flexible member 118 vertically upward, thereby opening the vehicle hood 120 to a first position P1. The first position P1 is a distance vertically upward with respect to the vehicle hood 120 in the closed position, wherein the distance is defined by the distance the second piston 112 retracts.

To raise a vehicle hood from the first position P1 to a second position P2, some methods include supplying positive air pressure to the first pneumatic cylinder 108, causing the first piston 110 to fully retract and the first cylinder 111 and affixed first intermediate carriage 105 to be pulled laterally toward the first end support 102. This causes the second cylinder 113, which is affixed to the first intermediate carriage 105, second intermediate carriage 106 affixed to the second cylinder 113, and second piston 112 to be pulled laterally toward the first end support 102. This further causes the flexible member 118 affixed to the second piston 112 and lift assembly 123 affixed to the flexible member 118 to be pulled vertically upward toward the pulley assembly 114, wherein the pulley assembly 114 redirects the flexible member laterally toward the first end support 102. When the lift assembly 123 is attached to a vehicle hood 120, the vehicle hood 120 is opened to a second position P2. The second position P2 is a distance vertically upward with respect to the first position P1, wherein the distance is defined by the distance the first piston 110 retracts.

In another method for raising a vehicle hood 120 from a first position P1 to a second position P2, positive air pressure is supplied to the first pneumatic cylinder 108, wherein the positive air pressure is sufficient to assist a user in raising a vehicle hood 120 from the first position P1 to the second position P2. Once the vehicle hood is raised to the second position P2, the air supply to the first pneumatic cylinder 108 is sufficient to maintain the vehicle hood 120 in the second position P2.

It should now be understood that the vehicle hood opening and closing devices shown and described herein may be used to rapidly and reliably open and close vehicle hoods on a vehicle production line, without causing damage to vehicle hoods. Further, it should now be understood that the vehicle hood opening and closing devices shown and described herein will securely maintain vehicle hoods in the open position, preventing unintended releases of vehicle hoods from the open position.

While particular embodiments and aspects of the embodiments have been illustrated and described herein, various other changes and modifications can be made without departing from the spirit and scope of the invention. Moreover, although various inventive aspects have been described herein, such aspects need not be utilized in combination. It is therefore intended that the appended claims cover all such changes and modifications that are within the scope of this invention.

What is claimed is:

1. A vehicle hood opening and closing device comprising:
    a slideable assembly for linear movement in a rail, the slideable assembly comprising:
        a linear separator bar with a first end affixed to a first end support and a second end affixed to a second end support;
        a first intermediate carriage positioned between the first end support and the second end support;
        a second intermediate carriage positioned between the second end support and the first intermediate carriage;
        a first pneumatic cylinder with a first piston affixed to the first end support and a first cylinder affixed to the first intermediate carriage;
        a second pneumatic cylinder with a second piston and a second cylinder, wherein the second cylinder is affixed to the first intermediate carriage and the second intermediate carriage;
        a pulley assembly affixed to the second end support;
        a lift assembly for coupling to a vehicle hood;
        a flexible element connecting the second piston to the lift assembly through the pulley assembly; and
    a pneumatic control system pneumatically coupled to the first pneumatic cylinder and the second pneumatic cylinder for raising and lowering the lift assembly.

2. The vehicle hood opening and closing device according to claim 1 further comprising a rail with a first end and a second end, wherein the first end support is affixed to the first end of the rail and the second end support is affixed to the second end of the rail, and the first intermediate carriage and the second intermediate carriage are slideably attached to the rail for linear movement with respect to the rail.

3. The vehicle hood opening and closing device according to claim 1, wherein the lift assembly further comprises a lift plate and at least two vacuum cups affixed to the lift plate.

4. The vehicle hood opening and closing device according to claim 3 further comprising a blow-off valve pneumatically coupled to the pneumatic control system and the at least two vacuum cups.

5. The vehicle hood opening and closing device according to claim 4 further comprising a blow-off disable valve positioned between the blow-off valve and the pneumatic control system, and pneumatically coupled to the pneumatic control system, the first pneumatic cylinder, and the second pneumatic cylinder.

6. The vehicle hood opening and closing device according to claim 1 further comprising brakes attached to the first and second pneumatic cylinders.

7. The vehicle hood opening and closing device according to claim 1, wherein the first and second pneumatic cylinders comprise speed control valves.

8. A vehicle hood opening and closing device comprising:
    a slideable assembly for linear movement in a rail, the slideable assembly comprising:
        a linear separator bar with a first end affixed to a first end support and a second end affixed to a second end support;
        a first intermediate carriage positioned between the first end support and the second end support;

a second intermediate carriage positioned between the second end support and the first intermediate carriage;
a first pneumatic cylinder with a first piston affixed to the first end support and a first cylinder affixed to the first intermediate carriage;
a second pneumatic cylinder with a second piston and a second cylinder, wherein the second cylinder is affixed to the first intermediate carriage and the second intermediate carriage;
a pulley assembly affixed to the second end support;
a lift assembly comprising at least two vacuum cups;
a flexible element connecting the second piston to the lift assembly through the pulley assembly;
a pneumatic control system pneumatically coupled to the first pneumatic cylinder and the second pneumatic cylinder for raising and lowering the lift assembly;
a first vacuum generator pneumatically coupled to one of the at least two vacuum cups; and
a second vacuum generator pneumatically coupled to another of the at least two vacuum cups.

9. The vehicle hood opening and closing device according to claim 8 further comprising a rail with a first end and a second end, wherein the first end support is affixed to the first end of the rail and the second end support is affixed to the second end of the rail, and the first intermediate carriage and the second intermediate carriage are slideably attached to the rail for linear movement with respect to the rail.

10. The vehicle hood opening and closing device according to claim 8 further comprising a blow-off valve pneumatically coupled to the pneumatic control system and the at least two vacuum cups.

11. The vehicle hood opening and closing device according to claim 10 further comprising a blow-off disable valve positioned between the blow-off valve and the pneumatic control system, and pneumatically coupled to the pneumatic control system, the first pneumatic cylinder, and the second pneumatic cylinder.

12. The vehicle hood opening and closing device according to claim 8 further comprising brakes attached to the first and second pneumatic cylinders.

13. The vehicle hood opening and closing device according to claim 8, wherein the first and second pneumatic cylinders comprise speed control valves.

14. The vehicle hood opening and closing device according to claim 8 further comprising a first vacuum confirm valve and a second vacuum confirm valve, wherein:
the first vacuum confirm valve is pneumatically coupled to a pneumatic conduit connecting the first vacuum generator to one of the at least two vacuum cups, and pneumatically coupled to the second vacuum confirm valve; and
the second vacuum confirm valve is pneumatically coupled to a pneumatic conduit connecting the second vacuum generator and another of the at least two vacuum cups, and pneumatically coupled to the first pneumatic cylinder and the second pneumatic cylinder.

15. A method of opening a vehicle hood comprising:
conveying a vehicle on a vehicle production line;
providing a rail suspended over the vehicle production line;
providing a vehicle hood opening and closing device slideably attached to the rail, the vehicle hood opening and closing device comprising;
a linear separator bar with a first end affixed to a first end support and a second end affixed to a second end support;
a first intermediate carriage positioned between the first end support and the second end support;
a second intermediate carriage positioned between the second end support and the first intermediate carriage;
a first pneumatic cylinder with a first piston affixed to the first end support and a first cylinder affixed to the first intermediate carriage;
a second pneumatic cylinder with a second piston and a second cylinder, wherein the second cylinder is affixed to the first intermediate carriage and the second intermediate carriage;
a pulley assembly affixed to the second end support;
a lift assembly for coupling to a vehicle hood;
a flexible element connecting the second piston to the lift assembly through the pulley assembly;
attaching the lift assembly to a vehicle hood of a vehicle conveyed on the vehicle production line; and
supplying air pressure to the first and second pneumatic cylinders, such that the first and second pistons fully retract into the housings of the first and second cylinders such that the first cylinder and attached first intermediate carriage are pulled laterally toward the first end support, the second cylinder and attached second intermediate carriage are pulled laterally toward the first end support, the flexible element is pulled vertically upward toward the pulley assembly and redirected through the pulley assembly laterally toward the first end support, and the lift assembly with an attached vehicle hood is pulled vertically upward, thereby opening the vehicle hood.

16. The method of opening a vehicle hood according to claim 15, wherein a vehicle hood is opened to a first position by supplying air pressure only to the second pneumatic cylinder causing the second piston to fully retract into the housing of the second cylinder, the flexible element to be pulled vertically upward toward the pulley assembly and redirected through the pulley assembly laterally toward the first end support, and the lift assembly with an attached vehicle hood to be pulled vertically upward, thereby opening the vehicle hood to the first position.

17. The method of opening a vehicle hood according to claim 16, wherein a vehicle hood is opened from the first position to a second position by supplying air pressure to the first pneumatic cylinder, such that the first pneumatic cylinder assists a user in opening the vehicle hood to the second position.

18. The method of opening a vehicle hood of claim 15, wherein:
the lift assembly further comprises a lift plate and at least two vacuum cups affixed to the lift plate;
a first vacuum generator is pneumatically coupled to one of the at least two vacuum cups; and
a second vacuum generator is pneumatically coupled to another of the at least two vacuum cups.

19. The method of opening a vehicle hood according to claim 18, wherein the vehicle hood is opened to a first position by supplying air pressure only to the second pneumatic cylinder causing the second piston to fully retract into the housing of the second cylinder, the flexible element to be pulled vertically upward toward the pulley assembly and redirected through the pulley assembly laterally toward the first end support, and the lift assembly with an attached vehicle hood to be pulled vertically upward, thereby opening the vehicle hood to the first position.

20. The method of opening a vehicle hood according to claim 19, wherein a vehicle hood is opened from the first position to a second position by supplying air pressure to the first pneumatic cylinder such that the first pneumatic cylinder assists a user in opening the vehicle hood to the second position.

* * * * *